United States Patent [19]
Arnold

[11] 3,811,319
[45] May 21, 1974

[54] MEMBRANE, GAS SEPARATOR WITH MEANS FOR REMOVING WATER VAPOR

[75] Inventor: James T. Arnold, Los Gatos, Calif.
[73] Assignee: Varian Associates, Palo Alto, Calif.
[22] Filed: Dec. 1, 1971
[21] Appl. No.: 203,894

Related U.S. Application Data

[63] Continuation of Ser. No. 12,560, Feb. 19, 1970, abandoned.

[52] U.S. Cl. .................................... 73/23, 55/158
[51] Int. Cl. .. G01n 31/08, B01d 13/00, B01d 53/22
[58] Field of Search ............ 73/23, 23.1; 55/16, 74, 55/75, 158, 197, 208, 387, 389

[56] References Cited
UNITED STATES PATENTS

| | | | |
|---|---|---|---|
| 3,421,292 | 1/1969 | Llewellyn | 55/158 |
| 3,264,803 | 8/1966 | Read | 55/208 |
| 3,638,401 | 2/1972 | Kabler | 55/158 |
| 3,274,750 | 9/1966 | Robb | 53/16 |
| 3,246,449 | 4/1966 | Stern et al. | 55/16 |
| 3,208,197 | 9/1965 | Simon et al. | 55/158 X |

Primary Examiner—Herbert Goldstein
Attorney, Agent, or Firm—Stanley Z. Cole, Gerald M. Fisher

[57] ABSTRACT

A portable three membrane type gas separator including an input region, and output region and two interstage regions defined between adjacent membranes. The second interstage region, closest to the output region, includes a pump or trap for pumping water vapor from the second interstage at a pumping speed which substantially exceeds the pumping speed of the pump or trap for nitrogen, whereby water vapor is prevented from overloading the high vacuum pump connected in gas communication with the output stage of the separator and any additional vacuum pump connected into the second interstage region of the separator. A suitable pump for pumping water vapor includes a desicant material such as zeolite, alumina or phosphorous pentozide.

7 Claims, 3 Drawing Figures

INVENTOR.
JAMES T. ARNOLD
ATTORNEY

MEMBRANE, GAS SEPARATOR WITH MEANS FOR REMOVING WATER VAPOR

This is a continuation of application Ser. No. 12,560 filed Feb. 19, 1970, now abandoned.

DESCRIPTION OF THE PRIOR ART

Heretofore, two membrane type gas separators have been employed for separating condensible organic materials from permanent carrier gas streams. Such separators are disclosed and claimed in U.S. Pat. Nos. 3,455,092 and 3,429,105 assigned to the same assignee as the present invention. These gas separators each include an interstage region between the two membranes which is evacuated by a high vacuum pump to a relatively low pressure on the order of 0.001 to 0.1 torr, partial pressure of nitrogen. When such membrane type gas separators are employed in an application where the carrier gas stream includes a substantial amount of water vapor along with the organic material to be separated, it is found that the water vapor passes through the membranes to the mass spectrometer or other type of gas analyzer connected to the output of the gas separator. The water vapor also passes to the high vacuum pump which is connected to the interstage region. The water vapor tends to overload the high vacuum pumps and the mass spectrometer or other evacuated gas analyzer. Therefore, in these situations, where the carrier gas stream includes a substantial amount of water vapor, such as in air samples, it is desired to obtain means for removing the water vapor to avoid overloading the high vacuum pumps and the gas analyzer.

SUMMARY OF THE PRESENT INVENTION

The principal object of the present invention is the provision of an improved membrane gas separator having means for removing water vapor.

One feature of the present invention is the provision in a membrane gas separator of three series connected gas separating membranes to define an input region, an output region and two interstage regions, such interstage regions being pumped with first and second vacuum pumps, respectively, the second vacuum pump having a pumping speed for water vapor which substantially exceeds the pumping speed of the second pump for nitrogen, whereby water vapor is substantially removed before reaching the output region of the separator or an additional high vacuum pump connected to the second interstage downstream of the water vapor pump.

Another feature of the present invention is the same as the preceding feature wherein the water vapor pumping means includes a solid desicant material for trapping the water vapor.

Another feature of the present invention is the same as the immediately preceding feature wherein the desicant pumping material is selected from the group consisting of zeolite, alumina, and phosphorous pentoxide.

Other features and advantages of the present invention will become apparent upon a perusal of the following specification taken in connection with the accompanying drawing wherein:

DESCRIPTION OF THE PREFERRED EMBODIMENTS

Figure 1:
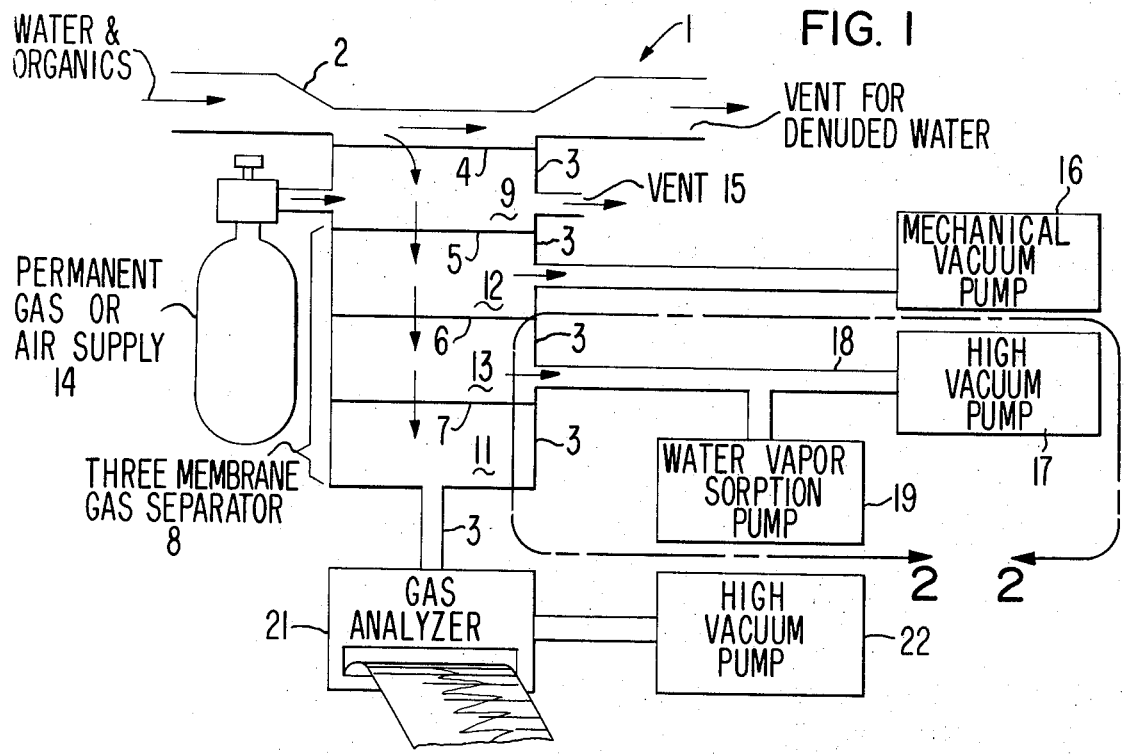
FIG. 1 is a schematic line diagram, partly in block diagram form, depicting a gas analysis system employing a membrane gas separator incorporating features of the present invention.

Referring now to FIG. 1, there is shown a gas analysis system 1 incorporating features of the present invention. The gas analysis system includes a liquid conduit 2 arranged for directing a stream of liquid, containing organic material to be analyzed, across the end of a gas conduit 3 which is closed off by a first semi-permeable membrane 4 so that the liquid plus organic material is directed across the face of the semi-permeable membrane 4. Membrane 4 is relatively permeable to organic material and relatively impermeable to inorganic liquids, such as water, and permanent gases that may be carried in the liquid. Suitable material for membrane 4 is a 0.001" thick membrane of dimethyl silicone polymer.

Three additional membranes 5, 6 and 7, each smiliar to membrane 4, are hermetically sealed across the gas passageway 2 in series with a gas flow path through the gas passageway 3 to define a three membrane gas separator 8. The gas separator 8 includes an input region 9 and an output region 11, downstream of the last membrane 7, and two interstage regions 12 and 13 defined by the region in the passageway 3 between adjacent membranes 5 and 6, and 6 and 7, respectively.

A supply of permanent gas 14, such as $N_2$, $O_2$, or air, is arranged to direct a stream of permanent carrier gas through the input region 9 and out through vent 15. The permanent carrier gas stream serves to pick up the organic vapors passing through the first membrane 4 and to carry these organic vapors across the first input membrane 5 of the gas separator.

The first interstage region 12 is connected to a mechanical vacuum pump 16 for evacuating the interstage region 12 to a suitable pressure, as of 0.1 to 10 torr partial pressure of the nitrogen carrier gas constituent, when air is employed as the carrier gas. The second interstage 13 is connected to a high vacuum pump 17 via conduit 18. A water vapor sorption pump 19 is connected into the conduit 18 between the second interstage 13 and the high vacuum pump 17 for preferentially removing water vapor from the interstage region 13 and for preventing water vapor from overloading the high vacuum pump 17. The high vacuum pump 17 evacuates the interstage region 13 to a relatively low pressure, such as 0.001 to 0.1 torr partial pressure of the major carrier gas constituent.

The output stage 11 of the three stage membrane gas separator 8 is connected in gas communication with the input to a gas analyzer 21, such as a mass spectrometer or quadrupole gas analyzer. Gas analyzer 21 is evacuated to a relatively low pressure as of $10^{-7}$ to $10^{-5}$ torr via a high vacuum pump 22, such as a getter-ion vacuum pump.

In operation, water or other inorganic liquid, containing a substantial proportion of water plus organic material to be detected, is caused to flow through conduit 2 across the face of the first membrane separator 4 which denudes the liquid of the condensible organic materials which diffuse through the first membrane 4 along with water vapor to enter the input region 9 of the gas separator 8 in the vapor state.

In the input region 9, the vaporized organic material along with a certain amount of water vapor which will not exceed 100% relative humidity is picked up in the permanent gas carrier stream and carried across the input membrane 5 of the gas separator 8. The condensible organic vapors in the carrier gas stream diffuse through the input membrane 5 of the gas separator 8 along with a certain amount of water vapor and a relatively small amount of the carrier gas such that the concentration of the organic vapor in the carrier gas as passed into the first interstage region 12 is substantially enriched, as by a factor of 100 to 1,000, compared to the concentration of the organic vapor in the carrier stream in the input region 9.

In the first interstage region 12, a major portion of the carrier gas is withdrawn via the mechanical vacuum pump, whereas a portion of the organic vapors along with a certain amount of water vapor pass through the second membrane 6 into the second interstage region 13. As in the case of the gas separation performed by the first membrane 5, a further enrichment, on the order of 100 to 1,000, of the concentration of organic vapors in the carrier gas stream passed into the second interstage region 13 is obtained by gas passage through membrane 6. In the second interstage region 13, water vapor is removed by being preferentially pumped by the water vapor sorption pump 19 connected in gas communication with interstage region 13 upstream of the high vacuum pump 17 to prevent overloading of the high vacuum pump 17 by water vapor. The organic vapors pass through the output membrane 7 to the output stage 11, whereas the permanent gases are held back by membrane 7 in the same manner as separation was obtained by membranes 5 and 6 such that an additional enrichment is obtained in the concentration of the organic vapor in the gas passed through the output membrane 7.

A three membrane gas separator 8 of the type herein described is particularly effective in enriching the concentration of the organic material in the gas sample passed through the gas separator 8, to the gas analyzer 21. More particularly, the separator 8 is capable of producing an enrichment on the order of $10^6$ to $10^9$, such that a typical gaseous mixture containing 1 part per million of an organic compound in the input region 9 is transformed into a mixture at the output region 11, composed of 10 parts of the organic vapor to one part of carrier gas such as nitrogen. This enrichment is achieved without serious decrement of the organic vapors. The gas analysis system of FIG. 1 readily permits detection of organic compounds in concentration in the gas stream input region 9 as low as one hundredth of a picogram ($10^{-12}$ grams) per cc of gas.

In an analyzer 1, as shown in FIG. 1, where water plus organic material is passed across the first membrane separator 4, the water vapor in the input region 9 is on the order of 100 percent relative humidity. If it were not for the third membrane gas separator 7, forming the second interstage region 13, and the provision of the water vapor sorption pump 19, the water vapor passing through the membranes 5, 6 and 7 would constitute a water load greater than the vacuum pump 22 or the high vacuum pump 17 could handle. However, with the provision of the water vapor sorption pump 19, the transmission of water vapor through the membrane separator 8 is substantially eliminated. For the sake of explanation, a three membrane gas separator 8 has been shown in a system wherein water vapor would constitute a substantial problem were it not for the third stage of the membrane separator 8 and the water vapor soprtion pump 19. However, it is to be understood that the analysis system need not employ the water-to-vapor separation stage formed by membrane 4. The gas separator 8 is employed to advantage for analyzing organic vapor constituents of the atmosphere or other water vapor laden carrier gas streams. In such a case, the apparatus would be substantially the same as that of FIG. 1 with deletion of the conduit 2 and first membrane 4. Also, in the system of FIG. 1, there need not be two high vacuum pumps 17 and 22, as one high vacuum pump may be employed with a first conduit connecting it to the gas analyzer 21 and a second lower conductance conduit connecting it to conduit 18 downstream of the water vapor sorption pump 19.

Figure 2:
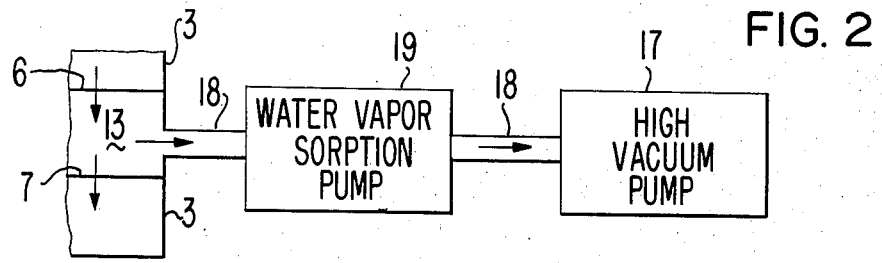
FIG. 2 is an alternative embodiment to a portion of the structure FIG. 1 delineated by line 2—2.

Referring now to FIG. 2, there is shown an alternative embodiment of the present invention. This embodiment is substantially the same as that of FIG. 1 with the exception that the water vapor sorption pump 19 is connected in series between the second interstage region 13 and the high vacuum pump 17.

Figure 3:
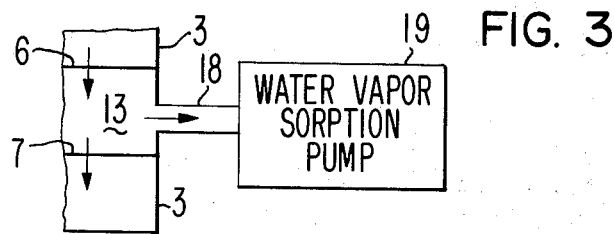
FIG. 3 is an alternative embodiment to the structure of FIG. 2.

Referring now to FIG. 3, there is shown an alternative embodiment of the present invention. This embodiment is substantially the same as that of FIG. 1 with the exception that the water vapor sorption pump 19 is connected as a blind pump to the conduit 18 in gas communication with the second interstage region 13 for pumping water vapor. In this case, nitrogen or other permanent gas constituent of the carrier gas stream, which is at a relatively low concentration in the second interstage region 13, is permitted to be respired by the sorption pump 19. In a typical example of a water vapor sorption pump 19 as connected into gas analyzer systems of FIGS. 1-3, it has been found that a pump 19 having a capacity of approximately 100 grams of processed zeolite provides adequate water vapor pumping for approximately 1,000 hours of operation. In addition, the zeolite fill for the water vapor sorption pump 19 may be reprocessed in place by baking the sorption pump 19, while evacuating same to remove the water vapor.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gas separator system, means forming a gas conduit for a gas stream consisting of a permanent carrier gas, water vapor, and a sample material to be separated, such gas conduit having at least three gas separating membranes hermetically sealed across said conduit in series with a gas flow path through said separator to define an input region, an output region and two interstage regions defined between adjacent membranes, such interstage regions being disposed intermediate said input and output regions, vacuum pump means connected in gas communication with said first interstage region for evacuating same to a gas pressure below the gas pressure in said input region, second vacuum pump means connected in gas communication with said second interstage region for evacuating same to a pressure below that of said first interstage region, the improvement wherein, said second vacuum pump means includes means for pumping water vapor from said interstage region at a pumping speed which substantially exceeds the pumping speed of said second pump means for the permanent carrier gas constituent.

2. The apparatus of Claim 1 wherein said means for pumping water vapor includes a solid desicant material.

3. The apparatus of Claim 2 wherein said desicant material is selected from the group consisting of zeolite, alumina and phosphorous pentoxide.

4. The apparatus of claim 1 wherein said first interstage region is evacuated to a partial pressure of the carrier gas in the range of 0.1 to 10 torr and wherein said second interstage region is evacuated to a partial pressure of the carrier gas in the range of 0.001 to 0.1 torr.

5. The apparatus of claim 1 wherein said three gas separating membranes are semi-permeable membranes which are relatively impermeable to permanent gases and relatively permeable to sample material to be separated.

6. The apparatus of claim 1 wherein said three gas separating membranes are made of dimethyl silicone.

7. The apparatus of claim 1 including an evacuated gas analyzer connected in gas communication with the output region of said membrane gas separator for analyzing the gases passing through said membrane gas separator.

* * * * *